US009784490B2

(12) United States Patent
Tippmann

(10) Patent No.: US 9,784,490 B2
(45) Date of Patent: Oct. 10, 2017

(54) REFRIGERATION SYSTEM WITH HUMIDITY CONTROL

(71) Applicant: Tippmann Companies LLC, Fort Wayne, IN (US)

(72) Inventor: Daniel J. Tippmann, Fort Wayne, IN (US)

(73) Assignee: Tippmann Companies LLC, Fort Wayne, IN (US)

( * ) Notice: Subject to any disclaimer, the term of this patent is extended or adjusted under 35 U.S.C. 154(b) by 629 days.

(21) Appl. No.: 13/829,899

(22) Filed: Mar. 14, 2013

(65) Prior Publication Data
US 2014/0260383 A1 Sep. 18, 2014

(51) Int. Cl.
F25B 49/00 (2006.01)
F25D 17/04 (2006.01)
(Continued)

(52) U.S. Cl.
CPC ............ F25B 49/02 (2013.01); F25B 6/04 (2013.01); F24F 1/0007 (2013.01);
(Continued)

(58) Field of Classification Search
CPC ............ F25B 6/04; F25B 2700/2104; F25B 2600/112; F25B 2600/111; F24F 2001/0037; F24F 1/0007; F25D 13/00; F25D 23/12
See application file for complete search history.

(56) References Cited

U.S. PATENT DOCUMENTS

2008/0102744 A1* 5/2008 Moore .................. B01D 53/30
454/239

2009/0288430 A1* 11/2009 Anderson ............... F25B 13/00
62/79
(Continued)

FOREIGN PATENT DOCUMENTS

EP 0 760 452 7/2008
JP H05223440 A * 8/1993
(Continued)

OTHER PUBLICATIONS

Hiroshi et al., Cold/Warm Serving Vehicle and Cooler Thereof, Aug. 31, 1993, JPH05223440A, Whole Document.*
(Continued)

*Primary Examiner* — Larry Furdge
(74) *Attorney, Agent, or Firm* — Faegre Baker Daniels LLP

(57) ABSTRACT

A refrigeration system includes a supplemental heat exchanger operably disposed between a condenser and an evaporator. This supplemental heat exchanger is located in selective fluid communication with the air in the conditioned space, and can be toggled between an "invisible" mode in which the heat exchanger acts as a simple fluid conduit between the condenser and evaporator, and a "humidity reduction" mode in which the heat exchanger operates to transfer heat from hot refrigerant to the colder conditioned space. This addition of heat into the conditioned space decreases the relative humidity of the conditioned space and subcools the refrigerant leading to the expansion valve and evaporator. This subcooling of the liquid enables the evaporator to operate at a lower temperature which enhances the moisture removal from the air moving through the evaporator. The supplemental heat exchanger may be located in a physically elevated position relative to the remainder of the conditioned space to utilize stratification of hot air to create a default "invisible mode" without inducing airflow.

15 Claims, 5 Drawing Sheets

(51) Int. Cl.
*F25B 49/02* (2006.01)
*F25B 6/04* (2006.01)
*F24F 1/00* (2011.01)

(52) U.S. Cl.
CPC . *F24F 2001/0037* (2013.01); *F25B 2600/111* (2013.01); *F25B 2600/112* (2013.01); *F25B 2700/2104* (2013.01); *Y02B 30/743* (2013.01); *Y10T 29/49359* (2015.01)

(56) References Cited

U.S. PATENT DOCUMENTS

| | | | | |
|---|---|---|---|---|
| 2010/0231100 | A1* | 9/2010 | Kato | F25D 21/14 |
| | | | | 312/236 |
| 2011/0225994 | A1* | 9/2011 | Fotiadis | F25D 17/062 |
| | | | | 62/80 |
| 2011/0302939 | A1* | 12/2011 | Rockenfeller | H02P 1/30 |
| | | | | 62/89 |

FOREIGN PATENT DOCUMENTS

| | | | |
|---|---|---|---|
| JP | H10329536 A | * | 12/1998 |
| KR | 20060015976 A | * | 2/2006 |

OTHER PUBLICATIONS

Yoshitoshi, Air Conditioner for Automobile, Dec. 15, 1998, JPH10329536A, Whole Document.*
Park et al., Ceiling Air Conditioner Indoor Structure, Feb. 21, 2006, KR20060015976A, Whole Document.*

* cited by examiner

REFRIGERATION SYSTEM WITH HUMIDITY CONTROL

BACKGROUND

1. Technical Field

The present disclosure relates generally to refrigerant based heat exchange systems, and more particularly to vapor compression refrigeration systems including humidity control.

2. Description of the Related Art

Vapor compression type refrigeration systems are used for controlling temperature and humidity within conditioned spaces. In the residential context, such air conditioning systems may be used to cool the air of the living space to a temperature below the ambient temperature outside the residence. In industrial applications, refrigeration systems may be used to cool and condition the air within walk-in/ drive-in coolers or freezers, such as for cooling and/or preservation of certain products.

Basic vapor compression refrigeration systems utilize a compressor, condenser, expansion valve and evaporator connected in serial fluid communication with one another forming an air conditioning or refrigeration circuit. A quantity of condensable refrigerant, such as R404 OR R517 refrigerant commonly used in refrigeration systems, is circulated through the system at varying temperatures and pressures, and is allowed to absorb heat at one stage of the system (e.g., within the cooled, conditioned space), and to dissipate the absorbed heat at another system stage (e.g., to the ambient air outside the cooled conditioned space). In the basic vapor compression refrigeration system, the evaporator is located within the conditioned space. Warm fluid, typically in the form of a liquid, is fed to the expansion valve, where the liquid is allowed to expand into a cold mixed liquid-vapor state. This cold fluid is then fed to an evaporator within the conditioned space.

The evaporator acts as a heat exchanger to effect thermal transfer between the cold refrigerant and the relatively warmer air inside the conditioned space, so that heat transfer to the refrigerant from the conditioned space vaporizes the remaining liquid to create a superheated vapor, i.e., a vapor that is measurably above its phase change temperature. This superheated vapor is then fed to a compressor that is typically located outside the conditioned space. The compressor compresses the refrigerant from a low-pressure superheated vapor state to a high pressure superheated vapor state thereby increasing the temperature, enthalpy and pressure of the refrigerant.

This hot vapor-state refrigerant is then passed into the condenser, which is located outside the conditioned space and typically surrounded by ambient air. Because the compressor sufficiently raises the pressure of the refrigerant, the resulting condensing temperature of the vapor is measurably higher than the ambient conditions surrounding the condenser. This temperature differential enables the condenser to effect a transfer of heat from the refrigerant to the ambient air as the high pressure refrigerant is passed through the condenser's heat exchanger at a substantially constant pressure.

This heat transfer effects another phase change in the refrigerant, from a hot vapor state to a slightly subcooled liquid state. This high temperature, liquid-phase refrigerant flows from the condenser and to the expansion valve to begin the process again.

As cold vapor-phase refrigerant passes through the evaporator as discussed above, the removal of heat from the conditioned air passing through the evaporator heat exchanger may cause the air passing through the heat exchanger to be cooled to below its saturation temperature, sometimes also referred to as a "dew point." This cooling causes moisture to precipitate out of the conditioned air, typically causing liquid or frost to form on the fins of the heat exchanger. In liquid form the condensed moisture will drip down into a catch pan or conduit where the liquid water can be withdrawn from the conditioned space. In the frozen state, the moisture will remain on the evaporator surfaces until a defrost cycle is able to melt the frost and enable it to drain out of the pan. In this way, vapor compression type refrigeration systems are able to remove a certain amount of humidity from the conditioned space. The amount of humidity removed from the conditioned space is a function of the volume of air moved through the evaporator, the temperature differential between the refrigerant and the air as the air passes through the evaporator and the dew-point of the air. A greater temperature differential increases the amount of moisture that precipitates out of the conditioned air, thereby effecting greater dehumidification. Similarly, a greater volume of air moved through the evaporator and cooled to a given temperature can also effect greater dehumidification.

In some applications, it is desirable to maintain independent control over both temperature and humidity within the conditioned space. For example, in commercial refrigeration systems such as those used for food products, it may be desirable to maintain a particular set point temperature range while controlling humidity below a particular upper threshold, so as to maintain food products at their desired storage temperature while avoiding any collection of liquid or frozen water upon the food product or on interior cooler/ freezer surfaces. Similarly, in some pharmaceutical applications, it is desirable to maintain specific temperature and humidity set point ranges in order to preserve the molecular structure, and thus the efficacy, of particular drug compounds.

In such applications, humidity control of the conditioned air must be effected without further cooling, and vice versa. Substantial design efforts have focused on variations of the standard vapor compression type refrigeration system to facilitate such independent control. For example, U.S. Pat. No. 6,826,921 teaches a "reheat" type heat exchanger within the conditioned space, and in a common air flow path with a traditional evaporator heat exchanger (see, e.g., heat exchangers 42 and 44 shown in FIG. 1). The reheat heat exchanger is selectively placed within the flow path of refrigerant by a separate and dedicated valve structure, and may be used to heat cold air coming from the output of the evaporator. This, in turn, allows the air passing through the evaporator to be made colder than it might otherwise be for a given temperature setpoint, such a larger amount of humidity precipitates from the air. Meanwhile, the reheat heat exchanger imparts additional heat to the outgoing air to avoid unwanted lowering of the set point temperature in the conditioned space while reducing the relative humidity of the air stream. However, both the evaporator heat exchanger and the reheat heat exchanger remain in the air flow of the fans moving air over the exchangers. This series type air flow arrangement through both heat exchangers permanently adds to the air flow restriction and requires additional fan power.

SUMMARY

The present disclosure provides a refrigeration system including a supplemental heat exchanger operably disposed between a condenser and an evaporator. This supplemental heat exchanger is located in selective fluid communication with the air in the conditioned space, and can be toggled between an "invisible" mode in which the heat exchanger acts as a simple fluid conduit between the condenser and evaporator, and a "humidity reduction" mode in which the heat exchanger operates to transfer heat from hot refrigerant to the colder conditioned space. This addition of heat into the conditioned space decreases the relative humidity of the conditioned space and subcools the refrigerant leading to the expansion valve and evaporator. This subcooling of the liquid enables the evaporator to operate at a lower temperature which enhances the moisture removal from the air moving through the evaporator. The supplemental heat exchanger may be located in a physically elevated position relative to the remainder of the conditioned space to utilize stratification of hot air to create a default "invisible mode" without inducing airflow.

Thus, the supplemental heat exchanger can be permanently disposed in the refrigerant fluid circuit, enabling the "cycling" of the heat exchange process while obviating the need for auxiliary valves and facilitating retrofit applications.

In one form thereof, the present disclosure provides a vapor compression refrigeration system for controlling a temperature and a humidity of a conditioned space, the system comprising: a quantity of refrigerant; a compressor having a compressor inlet receiving the quantity of refrigerant in a cool vapor state, the compressor operable to elevate a vapor pressure and a vapor temperature of the quantity of refrigerant such that the quantity of refrigerant is converted into a hot vapor state and discharged at a compressor outlet; a condenser disposed outside the conditioned space and downstream of the compressor, the condenser having a condenser inlet which receives the quantity of refrigerant in a hot vapor state downstream of the compressor outlet, the condenser operable to transfer heat from the quantity of refrigerant to ambient air around the condenser such that the quantity of refrigerant is converted to a liquid state and discharged at a condenser outlet; an expansion valve disposed downstream of the condenser, the expansion valve having an expansion valve inlet which receives the quantity of refrigerant in a liquid state, the expansion valve operable to expand the quantity of refrigerant from a liquid state to one of a cooled liquid state and a cooled vapor state which is discharged at an expansion valve outlet; an evaporator disposed in fluid communication with the conditioned space and downstream of the expansion valve outlet, the evaporator having an evaporator inlet which receives the quantity of refrigerant in one of a cooled vapor state and a cooled liquid state, the evaporator operable to transfer heat from air in the conditioned space to the quantity of refrigerant such that the quantity of refrigerant is converted to a cool vapor state and discharged at an evaporator outlet; and a heat exchanger positioned downstream of the condenser and upstream of the expansion valve, the heat exchanger having a heat exchanger inlet which receives the quantity of refrigerant in a liquid state at a first liquid temperature and a heat exchanger outlet which discharges a liquid at a second liquid temperature, the heat exchanger in selective fluid communication with the air in the conditioned space, the heat exchanger operable to transfer heat from the quantity of refrigerant to the air in the conditioned space when the heat exchanger is in fluid communication with the air, whereby the second liquid temperature is less than the first liquid temperature, and the heat exchanger operable as a non-heat exchanging fluid conduit when the heat exchanger is not in fluid communication with the air in the conditioned space, whereby the second liquid temperature is substantially equal to the first liquid temperature.

In another form thereof, the present disclosure provides a refrigeration system comprising: a refrigeration housing including insulated walls and an insulated ceiling enclosing a conditioned space; an insulated air space selectively thermally isolated from the conditioned space, the insulated air space having an air inlet adapted to selectively receive air from the conditioned space into the air space, and an air outlet adapted to selectively discharge air from the air space into the conditioned space; a heat exchanger disposed in the insulated air space between the air inlet and the air outlet; a vapor compression refrigeration system adapted to operate on the conditioned space, the system comprising: a quantity of refrigerant; a compressor having a compressor inlet receiving the quantity of refrigerant in a cool vapor state, the compressor operable to elevate a vapor pressure and a vapor temperature of the quantity of refrigerant such that the quantity of refrigerant is converted a hot vapor state and discharged at a compressor outlet; a condenser disposed outside the conditioned space and downstream of the compressor, the condenser having a condenser inlet which receives the quantity of refrigerant in a hot vapor state downstream of the compressor outlet, the condenser operable to transfer heat from the quantity of refrigerant to ambient air around the condenser such that the quantity of refrigerant is converted to a liquid state and discharged at a condenser outlet; an expansion valve disposed downstream of the condenser, the expansion valve having an expansion valve inlet which receives the quantity of refrigerant in a liquid state, the expansion valve operable to expand the quantity of refrigerant from a liquid state to one of a cooled vapor state and a cooled liquid state, which is discharged at an expansion valve outlet; an evaporator disposed in fluid communication with the conditioned space and downstream of the expansion valve outlet, the evaporator having an evaporator inlet which receives the quantity of refrigerant in one of a cooled vapor state and a cooled liquid state, the evaporator operable to transfer heat from air in the conditioned space to the quantity of refrigerant such that the quantity of refrigerant is converted to a cool vapor state and discharged at an evaporator outlet, the heat exchanger positioned downstream of the condenser and upstream of the expansion valve, the heat exchanger having a heat exchanger inlet which receives the quantity of refrigerant in a liquid state at a first liquid temperature and a heat exchanger outlet which discharges a liquid at a second liquid temperature, the heat exchanger operable to transfer heat from the quantity of refrigerant to the air in the conditioned space when air flows from the air inlet to the air outlet, whereby the second liquid temperature is substantially less than the first liquid temperature, and the heat exchanger operable as a non-heat exchanging fluid conduit when air stratifies within the air space, whereby the second liquid temperature is substantially equal to the first liquid temperature.

In yet another form thereof, the present disclosure provides a dual-zone refrigeration system, comprising: a refrigeration housing including insulated walls and an insulated ceiling enclosing a cool conditioned space and a cold conditioned space, the cool conditioned space thermally isolated from the cold conditioned space by an interior insulated wall; an air space selectively thermally isolated from the cool conditioned space, the air space having an air inlet adapted to selectively receive air from the cool conditioned space into the air space, and an air outlet adapted to selectively discharge air from the air space into the cool conditioned space; a heat exchanger disposed in the air space between the air inlet and the air outlet; a first vapor compression refrigeration system adapted to operate on the cool conditioned space, the system comprising a first quantity of refrigerant, a first compressor, a first condenser disposed outside the cool conditioned space, a first expansion valve, and a first evaporator disposed in fluid communication with the cool conditioned space, a second vapor compression refrigeration system adapted to operate on the cold conditioned space, the system comprising a second quantity of refrigerant, a second compressor, a second condenser disposed outside the cold conditioned space, a second expansion valve, and a second evaporator disposed in fluid communication with the cold conditioned space, the heat exchanger in fluid communication with the second quantity of refrigerant and positioned downstream of the second condenser and upstream of the second expansion valve, the heat exchanger selectively receiving air from the cool conditioned space via the air inlet and selectively discharging air to the cool conditioned space via the air outlet, the heat exchanger receiving the second quantity of refrigerant at a first temperature and discharging the second quantity of refrigerant at a second temperature, the heat exchanger operable to selectively transfer heat from the second quantity of refrigerant to the air in the cool conditioned space, such that the second temperature of the second quantity of refrigerant is below the first temperature of the second quantity of refrigerant when such transfer of heat takes place, and the second temperature of the second quantity of refrigerant is substantially equal to the first temperature of the second quantity of refrigerant when such transfer of heat does not takes place.

In still another form thereof, the present disclosure provides a method of installing a refrigeration system, the method comprising: placing an evaporator within a conditioned space; placing a condenser outside the conditioned space; connecting the evaporator to the condenser with a plurality of fluid conduits to create a closed loop; placing a quantity of refrigerant in the closed loop; operably connecting an expansion valve downstream of the condenser and upstream of the evaporator; operably connecting a compressor downstream of the evaporator and upstream of the condenser; operably interposing a heat exchanger downstream of the condenser and upstream of the expansion valve; and physically locating the heat exchanger in an air space that is selectively thermally isolated from the conditioned space, such that the heat exchanger can selectively transfer heat from the quantity of refrigerant to the conditioned space by selectively thermally isolating or exposing the heat exchanger to a flow of air from the conditioned space.

BRIEF DESCRIPTION OF THE DRAWINGS

The above-mentioned and other features of the disclosure, and the manner of attaining them, will become more apparent and will be better understood by reference to the following description of embodiments of the disclosure taken in conjunction with the accompanying drawings, wherein.

Corresponding reference characters indicate corresponding parts throughout the several views. The exemplifications set out herein illustrate embodiments of the disclosure and such exemplifications are not to be construed as limiting the scope of the invention in any manner.

DETAILED DESCRIPTION

Figure 1:
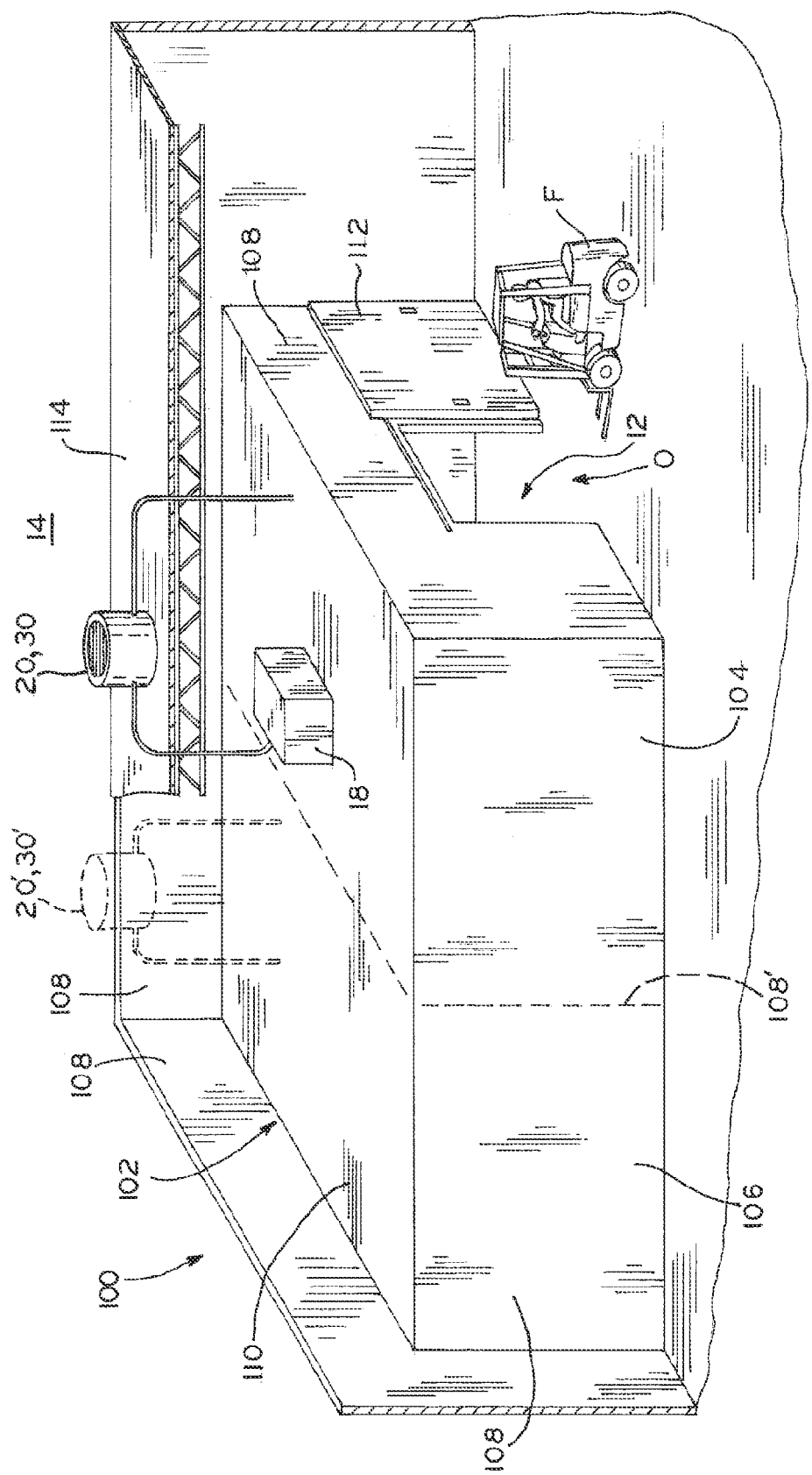
FIG. 1 is a perspective view of a portion of a warehouse, including a refrigeration housing utilizing a refrigeration system made in accordance with the present disclosure.

Referring now to FIG. 1, a corner of a storage area within warehouse 100 contains refrigeration housing 102, which may be one large refrigerated space or may be separated into a refrigerator 104 and a freezer 106 by interior wall 108' as described below. In the exemplary embodiments described herein, refrigeration housing 102 has sufficient internal volume to serve as an industrial sized refrigeration unit. For example, refrigeration housing may include a user access opening O of sufficient length and width for people and equipment, such as forklift F as shown in FIG. 1, to move therethrough. For purposes of the present disclosure, such an industrial sized refrigeration housing 102 includes insulated walls 108 and insulated ceiling 110 cooperating to provide a ceiling height of at least five feet and/or an internal volume sufficient to house products and walkway space for workers and/or equipment. For example, refrigeration housing 102 may enclose a conditioned space 12 defining a conditioned volume of at least 500 cubic feet, and in some embodiments as much as 10,000,000 cubic feet or more.

In the illustrated embodiment of FIG. 1, exterior walls of warehouse 100 form two of walls 108 forming the lateral boundaries of conditioned space 12. One of walls 108 includes opening O formed therein, with door 112 selectively positionable over opening O to enclose conditioned space 12. Insulated ceiling 110 is also contained within the enclosed volume of warehouse 100, with a separate exterior roof 114 spaced above insulated ceiling 110. This arrangement provides vertical headspace above insulated ceiling 110 for insulated protrusion 18, as discussed in further detail below. Meanwhile, condenser 30 can be disposed in ambient air 14 outside warehouse 100 to avoid exhausting heat into an inside space.

However, it is contemplated that other spatial arrangements for walls 108, ceiling 110, insulated protrusion 18 and roof 114 may be utilized as required or desired for a particular application, provided that insulated protrusion 18 defines a selectively thermally isolated air space 16 (FIG. 3) as described in detail below, and that conditioned space 12 is thermally isolated from ambient air 14.

Figure 2:
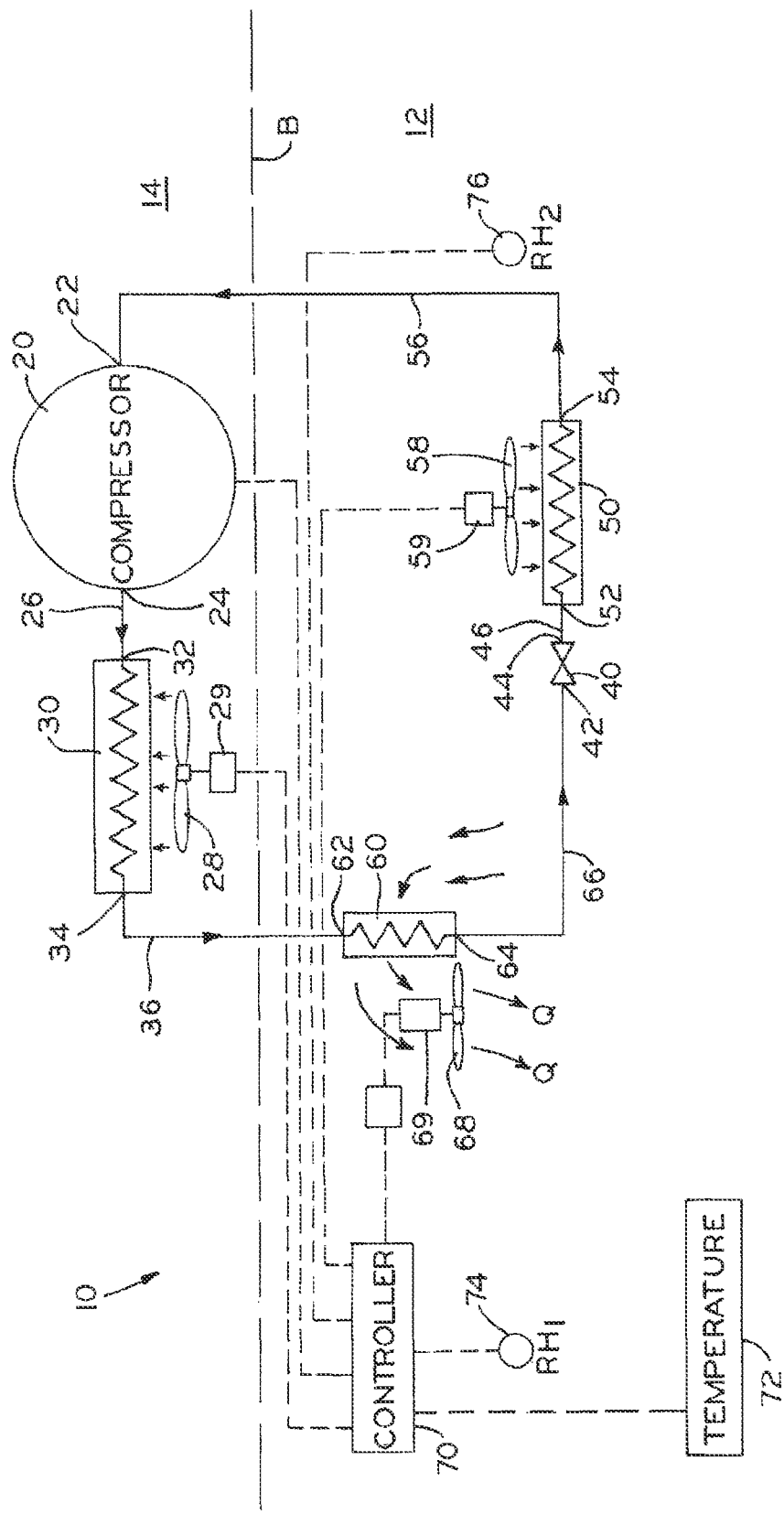
FIG. 2 is a schematic view of a refrigeration system made in accordance with the present disclosure.

Turning now to FIG. 2, a schematic illustration of refrigeration system 10 is shown in the context of boundary B between conditioned space 12 and ambient air 14. The components of refrigeration system 10 depicted in FIG. 2 (and of FIG. 4, described below) are shown in schematic format for clarity and conciseness, it being understood that several components, such as valves and heat exchangers, are illustrated in functional form only.

Refrigeration system 10 utilizes a closed loop of fluid conduits joining the various system components and passing back and forth between conditioned space 12 and ambient air 14. A quantity of refrigerant passes through the various fluid conduits 26, 36, 46, 56 and 66 and components 20, 30, 40, 50 and 60 to absorb heat from conditioned space 12 and discharge the absorbed heat into ambient air 14 as described in detail below, thereby cooling the air in conditioned space 12 relative to the temperature of the ambient air 14.

More particularly, compressor 20 receives cool or cold refrigerant in a vapor state at compressor inlet 22, and elevates the pressure of this vapor. According to the ideal gas law, pv=nrt, the elevation of the pressure of the warm vapor at a constant volume and in a constant amount causes an related increase in vapor temperature, thus, superheated pressurized vapor is discharged from compressor 20 at compressor outlet 24 and into fluid conduit 26.

This hot vapor is delivered to condenser 30 at condenser inlet 32, which passes the hot pressurized vapor through a tortuous path in the manner of a traditional heat exchanger. Air is passed over this tortuous fluid path to effect heat transfer from the hot, superheated refrigerant vapor to ambient air 14. This airflow over the heat exchanging elements of condenser 30 may be enhanced and controlled by condenser fan 28, which is positioned and oriented to force a flow of ambient air 14 over the heat exchanging elements of condenser 30. Thus, condenser 30 exhausts heat from the hot vapor received at condenser inlet 32 and converts such hot vapor into hot liquid, which is discharged at condenser outlet 34 and into fluid conduit 36. The structure and arrangement of condenser 30, in cooperation with control over condenser fan 28, ensures that the liquid passing through conduit 36 is measurably sub-cooled, i.e., is at a pressure and temperature combination that would require non-trivial changes to enthalpy of the refrigerant to convert the liquid back to a vapor.

Figure 3:
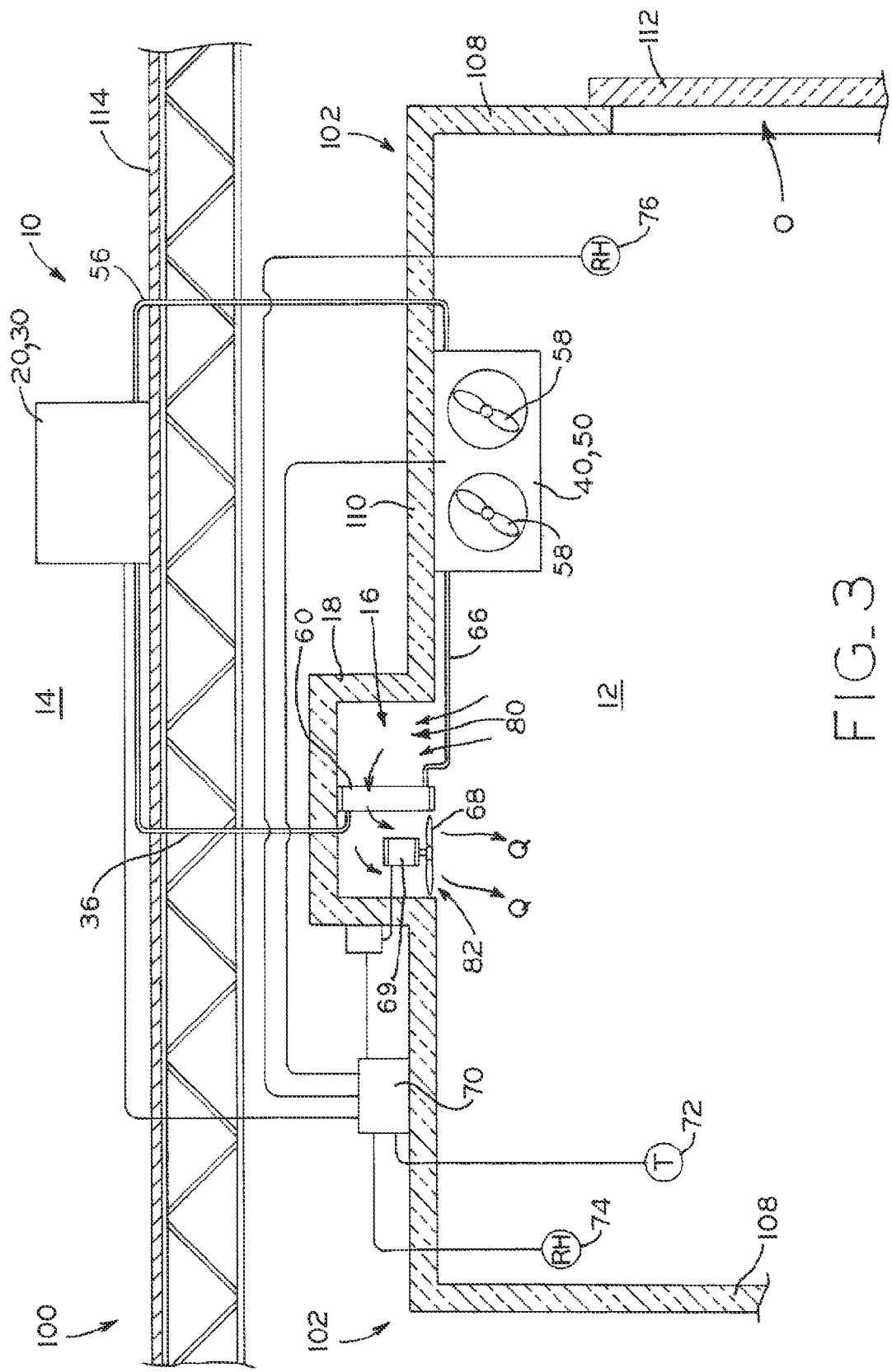
FIG. 3 is a cross-section, elevation view of the refrigeration system shown in FIG. 2, implemented in a single chamber refrigerator design.

With respect to the direction of refrigerant fluid flow through refrigeration system 10, supplemental heat exchanger 60 is positioned downstream of condenser 30 but upstream of expansion valve 40, as illustrated in FIG. 2. Thus, fluid conduit 36 is coupled to heat exchanger inlet 62, and provides hot liquid to supplemental heat exchanger 60. As shown in FIG. 3 and described in further detail below, heat exchanger 60 is located within selectively thermally isolated air space 16 defined by insulated protrusion 18, which protrudes upwardly from insulated ceiling 110 of refrigeration housing 102. Depending on the temperature of the air contained within air space 16, heat Q may be transferred from the hot liquid passing through supplemental heat exchanger 60 to discharge slightly cooled, warm liquid at heat exchanger outlet 64 or, alternatively, no heat exchange may take place within supplemental heat exchanger 60, thereby discharging hot liquid into fluid conduit 66 via heat exchanger outlet 64 which is the same or substantially the same temperature as the hot liquid flowing through fluid conduit 36.

For purposes of the present disclosure, the temperatures of liquid at heat exchanger inlet and outlet 62 and 64 can be considered "the same" or "equal" if such temperatures are not sufficiently different to materially effect the overall enthalpy of the quantity of refrigerant. For example, where refrigeration system 10 is sized to cool a common industrial cooler volume, such as approximately 180,000 cubic feet, a temperature differential up to about 2 degrees Fahrenheit between inlet and outlet 62, 64 can be considered insubstantial, such that the temperatures are considered substantially equal. Stated another way, when such temperatures are substantially equal, effectively no heat transfer is occurring from the refrigerant flowing through heat exchanger 60 to air space 16 (and then out to conditioned space 12), such that heat exchanger 60 is in a fluid-conduit only, non-heat-exchanging mode. Conversely, a larger temperature difference can be considered indicative of a reduction in enthalpy of the refrigerant, caused by active heat exchange taking place and the associated addition of a non-trivial amount of heat to conditioned space 12.

Whether still hot or merely warm upon exit from heat exchanger 60, liquid refrigerant is delivered to expansion valve 40 via fluid conduit 66 attached to expansion valve inlet 42. Expansion valve 40 operates to decrease the pressure of the hot or warm liquid refrigerant received therein, converting the liquid refrigerant to a cool or cold vapor/liquid mix, which is discharged at expansion valve outlet 44 into fluid conduit 46. This cool vapor/liquid mix is delivered to evaporator 50 via fluid conduit 46, which is fluidly coupled to evaporator inlet 52.

Like condenser 30 described above, evaporator 50 operates as a heat exchanger between the refrigerant passing therethrough and the surrounding air of conditioned space 12. However, in this case, the fluid passing through evaporator 50 is colder than the air within the conditioned space 12. Thus, as air passes over the tortuous fluid conduit of the heat exchanger within evaporator 50, heat from conditioned space 12 is transferred to the refrigerant. This heat exchange process fully boils the liquid refrigerant inside the evaporator and further superheats the refrigerant, such a cool or cold vapor is discharged at evaporator outlet 54 and into fluid conduit 56. In an exemplary embodiment, evaporator fan 58 is selectively controllable to force air from conditioned space 12 over the tortuous fluid path of evaporator 50, thereby controlling the amount of heat transfer from conditioned space 12 to the cold refrigerant. The resulting warmed vapor-state refrigerant is then delivered via fluid conduit 56 to compressor inlet 22, and the cycle begins anew.

Supplemental heat exchanger 60 can be used to selectively reduce the relative humidity within conditioned space 12. When air within conditioned space 12 is allowed to flow over the tortuous fluid conduit of supplemental heat exchanger 60, heat Q is transferred from the hot liquid flowing into heat exchanger inlet 62 to conditioned space 12. This addition of heat energy (i.e., sensible heat) raises the temperature within conditioned space 12. This elevated temperature is sensed by temperature sensor 72, which is located within conditioned space 12 as shown schematically in FIG. 2. Temperature sensor 72 sends a signal to controller 70, which is programmed with a desired set point temperature for conditioned space 12. Controller 70, in turn, activates refrigeration system 10 to remove the added heat from conditioned space 12 via evaporator 50. As described in detail above, this activation of evaporator 50 also removes moisture from the conditioned space.

As shown in FIG. 2, controller 70 is operably (e.g., electrically) connected to compressor 20, motor 29 of condenser fan 28, and motor 59 of evaporator fan 58. When controller 70 receives a signal from temperature sensor 72 that the temperature within conditioned space 12 is higher than its preprogrammed set point, controller 70 can activate or increase the speed of evaporator fan 58 by sending an appropriate signal to evaporator motor 59, thereby increasing the air flow over evaporator 50 and causing the cool vapor passing from evaporator inlet 52 to evaporator outlet 54 to absorb more heat from conditioned space 12. In addition, or alternatively, controller 70 may activate or increase the speed of condenser fan 28 by sending an appropriate signal to condenser motor 29, thereby increasing the air flow over condenser 30, and removing additional heat from the hot refrigerant passing from condenser inlet 32 to condenser outlet 34. At times when refrigeration system 10 is functioning, controller 70 also activates compressor 20 to ensure that the hot vapor passing through fluid conduit 26 to condenser 30 has a sufficiently high temperature to ensure effective heat transfer from the hot vapor state refrigerant to ambient air 14.

Controller 70 is also operable to toggle supplemental heat exchanger 60 between its "invisible" mode in which heat exchanger 60 operates as a mere fluid conduit (as further described below) and its "humidity reduction" mode in which heat exchanger 60 transfers heat Q into conditioned space 12 by selective activation of heat exchanger motor 69 to increase or decrease the speed of heat exchanger fan 68. More particularly, fan 68 draws air from conditioned space 12 into air space 16 and across the heat exchanger coils of supplemental heat exchanger 60. Thus, when motor 69 is activated, the air drawn through supplemental heat exchanger 60 exhausts heat Q (which is removed from the hot liquid passing from heat exchanger inlet 62 to heat exchanger outlet 64) into conditioned space 12. As described above, this addition of heat Q induces refrigeration system 10 to activate or extend its run time, so as to remove heat Q and associated ambient moisture within conditioned space 12, thereby maintaining the temperature set point while also lowering the relative humidity.

To facilitate the selective activation of heat exchanger fan 68, controller 70 may receive a signal indicative of the ambient relative humidity within conditioned space 12 from first and/or second humidity sensors 74, 76. Humidity sensor 74 measures relative humidity $RH_1$ at one location within conditioned space 12, while humidity sensor 76 measures relative humidity $RH_2$ at a different location within conditioned space 12, thereby giving an indication of the overall relative humidity throughout conditioned space 12. In some instances, it is contemplated that a single humidity sensor 74 may be used, while in other instances more than two humidity sensors 74, 76 may be used.

When controller 70 receives signals from humidity sensors 74, 76 indicating that the relative humidity within conditioned space 12 is above a preprogrammed threshold, controller 70 activates (or increases the speed of) heat exchanger motor 69 to cause heat exchanger fan 68 to draw a quantity of cooled air from conditioned space 12 over the warmed coils of supplemental heat exchanger 60, thereby exhausting heat Q into conditioned space 12 and inducing refrigeration system 10 to reduce the temperature, and therefore also the relative humidity, within conditioned space 12. When humidity sensors 74, 76 indicate that the relative humidity is again at or below the preprogrammed set point and controller 70, heat exchanger motor 69 may be slowed or stopped to mitigate the transfer of heat Q into conditioned space 12.

Referring now to FIG. 3, refrigeration system 10 is illustrated in the context of refrigeration housing 102 within warehouse 100 (see also FIG. 1). The structure and arrangement of refrigeration housing 102 and warehouse 100 provides for efficient and effective operation of refrigeration system 10 and, in particular, allows supplemental heat exchanger 60 to be selectively placed into, or removed from, fluid communication with the cooled air in conditioned space 12. As further described below, this selective fluid communication between conditioned space 12 and supplemental heat exchanger 60 allows heat exchanger 60 to become functionally "invisible" to refrigeration system 10 without the use of valves or other structures to remove heat exchanger 60 from the flow path of refrigerant in the closed loop of system 10. Stated another way, heat exchanger 60 may function to exhaust heat Q into conditioned space 12 when air is allowed to flow from conditioned space 12 into selectively thermally isolated air space 16, but acts as a mere fluid conduit when such air flow is prevented.

More particularly, insulated ceiling 110 includes insulated protrusion 18 extending upwardly therefrom, thereby providing a thermally isolated air space 16 located within insulated protrusion 18 and disposed physically above the remainder of conditioned space 12. As refrigerant flows from fluid conduit 36, through supplemental heat exchanger 60 and into fluid conduit 66, heat exchanger 60 radiates heat into air space 16 of insulated protrusion 18. Owing to the principle of air stratification, which dictates that hot air is lighter than cold air and will settle at an elevated position in the absence of active inducement to the contrary, the heat from heat exchanger 60 warms the air within air space 16, which remains trapped in the elevated position within insulated protrusion 18 and above conditioned space 12. As the air is further warmed by the liquid refrigerant passing through heat exchanger 60, stronger stratification causes the warmed air to be more firmly trapped within insulated protrusion 18.

Eventually, the air within air space 16 may reach a temperature at or near the temperature of the hot refrigerant received at heat exchanger inlet 62 from fluid conduit 36, such that no heat exchange occurs between the coils of heat exchanger 60 and the surrounding air in air space 16. In the absence of any heat exchange, the liquid-phase refrigerant discharged at heat exchanger outlet 64 into fluid conduit 66 is the same or substantially the same temperature as the liquid refrigerant in fluid conduit 36. In this state, heat exchanger 60 acts as a mere fluid conduit through which refrigerant passes without effecting the operation of refrigeration system 10. Stated another way, because heat exchanger 60 is not performing a heat exchange function between the refrigerant flow and the air contained within insulated protrusions 18, heat exchanger 60 is functionally absent from refrigeration system 10. Thus, when the air in air space 16 is the same temperature as the refrigerant flowing through heat exchanger 60, heat exchanger 60 may be functionally identical as a mere extension of fluid conduits 36 or 66 through the same space.

However, as noted above, air space 16 is selectively thermally isolated from (or, conversely, exposed to) conditioned space 12. Heat exchanger fan 68 is functionally interposed between air space 16 and conditioned space 12, so that when fan 68 is activated, the stratification of air within insulated protrusion is disrupted and heat exchanger once again operates to cool the refrigerant passing therethrough while warming the air of conditioned space 12. In the exemplary embodiment illustrated in FIG. 3, heat exchanger fan 68 can be oriented downwardly at the junction between isolated air space 16 and conditioned space 12 (i.e., substantially flush with insulated ceiling 110 and at the bottom of insulated protrusion 18). Thus, when heat exchanger motor 69 is activated, air is pulled from conditioned space 12 into isolated air space 16 via air inlet 80, and outwardly via air outlet 82. Supplemental heat exchanger 60 is interposed between air inlet 80 and air outlet 82, such that the air flow caused by activation of heat exchanger motor 69 draws cooled conditioned air from conditioned space 12 through supplemental heat exchanger 60 and exhausts the warmed air from selectively isolated air space 16 into conditioned space 12. Thereafter, the air passing through supplemental heat exchanger 60 is continuously warmed by heat transfer from the hot liquid state refrigerant passing from heat exchanger inlet 62 to heat exchanger outlet 64.

In one exemplary embodiment, air inlet 80 and air outlet 82 are both open to conditioned space 12, and may simply be an open-air boundary between conditioned space 12 and air space 16. In this configuration, air stratification is the sole mechanism whereby conditioned space 12 is thermally obstructed from air space 16. In this arrangement, the bottom opening of insulated protrusion 18 is physically open to conditioned space 12, but heat Q will not flow. However, it is contemplated that physical barriers may also be introduced, such as sliding or hinged doors which not only thermally isolate air space 16 from conditioned space 12, but also physically isolate spaces 12, 16 from one another. Moreover, it is contemplated that a refrigeration system in accordance with the present disclosure may be implemented without insulated protrusion 18 in ceiling 110, provided a thermally isolated air space is established in fluid communication with conditioned space 12, is able to contain supplemental heat exchanger 60, and is able to selectively exhaust heat from refrigeration system 10 into conditioned space 12 via heat exchanger 60. Thus, air inlet 80 and air outlet 82 may take any form by which air can flow therethrough, depending on what is required or desired for a particular application.

Referring still to FIG. 3, insulated protrusion 18 extends into a head space above insulated ceiling 110 of refrigeration housing 102, while remaining below roof 114 of warehouse 100. In the illustrated embodiment, compressor 20 and condenser 30 are combined into a single unit located in ambient air 14 on top of roof 114 of warehouse 100, so that heat absorbed from conditioned space 12 can be exhausted outside of warehouse 100. Similarly, expansion valve 40 and evaporator 50 are combined into a single unit disposed within conditioned space 12 (e.g., attached to an interior surface of insulated ceiling 110 as illustrated).

In the exemplary embodiment illustrated in FIGS. 2 and 3, supplemental heat exchanger 60 is operable to lower the relative humidity within conditioned space 12 while recapturing a substantial amount of the energy used to reduce the humidity. Heat Q exhausted into conditioned space 12 is withdrawn from the hot liquid phase refrigerant discharged from condenser 30 as noted above, such that any heat transferred to conditioned space 12 by supplemental heat exchanger 60 would otherwise have been provided to expansion valve 40 (FIG. 2). To the extent that heat Q is added to conditioned space 12, it is removed from the liquid phase refrigerant received at expansion valve inlet 42, thereby requiring reduced liquid cooling at expansion valve 40, which reduces the amount of compressor capacity required to convert the liquid phase refrigerant into the cooled refrigerant vapor/liquid mix provided to evaporator inlet 52. Thus, to the extent that refrigeration system 10, and particularly evaporator 50, must do extra work to remove the added heat Q from conditioned space 12, much of this extra work is offset by the reduced work necessary for liquid cooling at expansion valve 40.

Moreover, in an exemplary embodiment, the location of supplemental heat exchanger 60 upstream of evaporator 50 and downstream of condenser 30 places heat exchanger 60 out of the flow path of air forced over evaporator 50 by evaporator fan 58. Thus, unlike some other "reheat" arrangements designed to control relative humidity, heat exchanger 60 does not impede the flow of air over the other heat exchangers in refrigeration system 10 or effect such flow in any way when supplemental heat exchanger 60 is inactive (i.e., when the temperature within selectively thermally isolated air space 16 is the same or substantially the same as the temperature of the liquid phase refrigerant passing through supplemental heat exchanger 60). Moreover, when supplemental heat exchanger 60 is inactive, refrigeration system 10 operates with efficiency that is substantially unchanged from a system which does not include heat exchanger 60. This is because heat exchanger 60 acts as a mere fluid conduit when the temperature of the air surrounding heat exchanger 60 is elevated as noted above. In an exemplary embodiment, only a slight reduction in fluid pressure may occur between heat exchanger inlet 62 and heat exchanger outlet 64, and in some designs this pressure drop may be commensurate with what would normally occur in a plain fluid conduit occupying the same physical span between fluid conduits 36 and 66.

The particular structure and arrangement of refrigeration system 10 is also amenable to a retrofit for previously existing standard refrigeration systems. For purposes of the present disclosure, preexisting structures are structures which are not purpose-built to accommodate a refrigeration system in accordance with the present disclosure, such as refrigeration system 10. For example, preexisting walls 108 or ceiling 110 may be those which were built, used for a time with a traditional refrigeration system, then converted into use with refrigeration system 10 by integration of heat exchanger 60 disposed in selectively thermally isolated air space 16.

In one retrofit application of refrigeration system 10, a hole may be cut in a preexisting insulated ceiling 110, and insulated protrusion 18 may be built around the cut hole. This can create thermally isolated air space 16 where a continuous, planar portion of insulated ceiling 110 was previously. Supplemental heat exchanger 60 may then be installed within the newly created thermally isolated air space 16, and functionally interposed between a preexisting condenser 30 and a preexisting evaporator 50. An existing controller 70 may be reprogrammed to monitor relative humidity, such as through the use of existing or added humidity sensors 74, 76. Heat exchanger fan 68 is then installed between conditioned space 12 and isolated air space 16, and is selectively activated to lower relative humidity as described in detail above.

In an alternative retrofit, thermally isolated air space 16 may be provided elsewhere within conditioned space 12. For example, in instances where it may be impractical to create insulated protrusion 18, any insulated enclosure may be placed within conditioned space 12 and provided with selectively openable air inlets and outlets 80, 82. When controller 70 indicates that heat from the hot liquid-phase refrigerant discharged from condenser 30 should be distributed to conditioned space 12 to control relative humidity, such apertures for inlets 80 and outlets 82 can be opened to allow air from conditioned space 12 to flow into the insulated enclosure to allow such heat transfer to take place.

The system shown in FIGS. 2 and 3 operates on a single zone, i.e., conditioned space 12. However, it is contemplated that the principles of the present disclosure can also be applied to multi-zone conditioned spaces to not only control relative humidity, but also to enhance overall system efficiency while reducing system cost.

Figure 4:
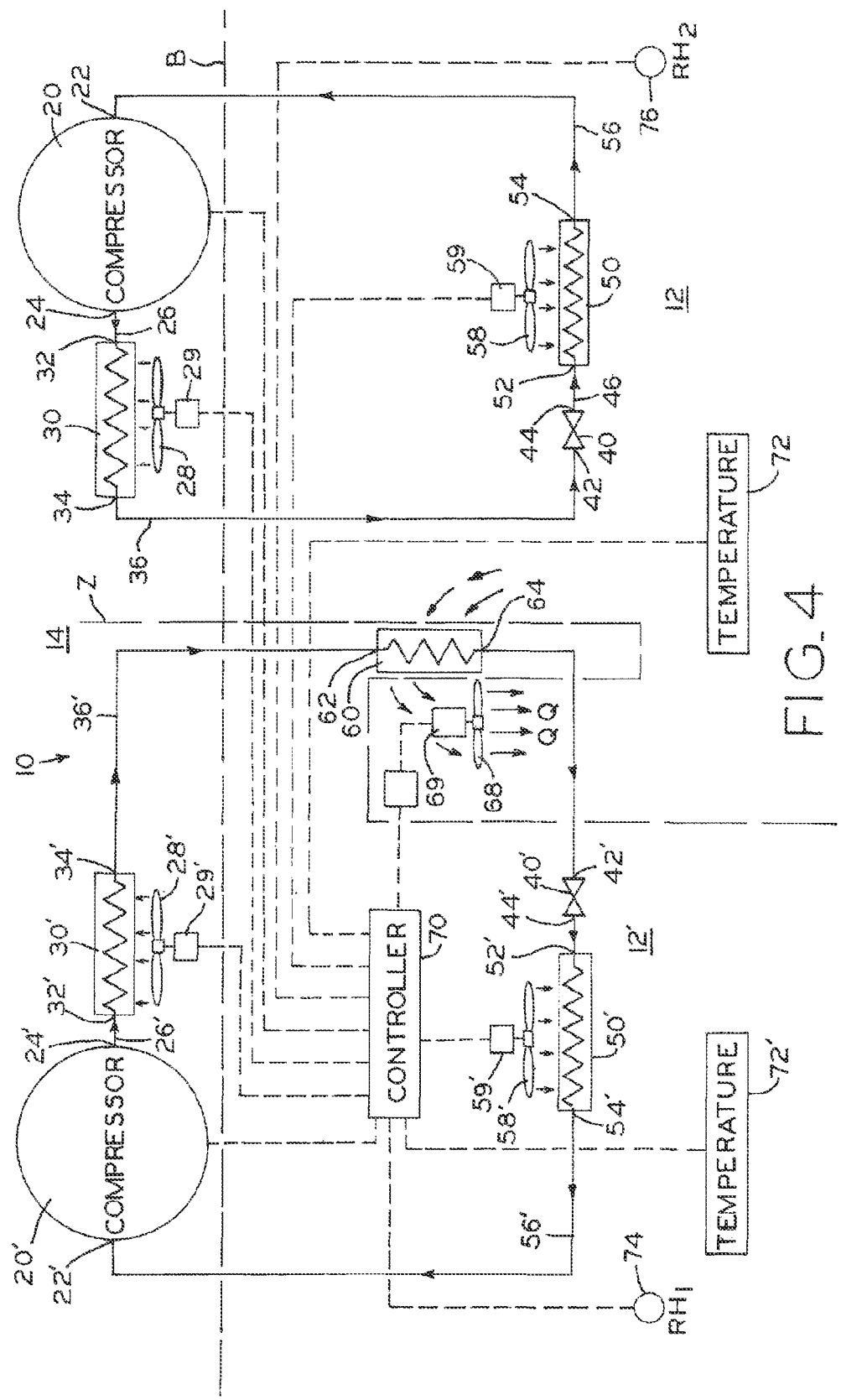
FIG. 4 is a schematic view of another refrigeration system made in accordance with the present disclosure utilizing a dual temperature design.

For example, FIG. 4 schematically illustrates a dual temperature refrigeration system 10' utilizing supplemental heat exchanger 60. Refrigeration system 10' is similar to refrigeration system 10 described in detail above, and like reference numerals define like structures in both of refrigeration systems 10 and 10'. Structures unique to system 10' include a "prime" indicator appended to the reference numeral to denote structures analogous to the comparable structures of system 10 having the same reference numeral.

Figure 5:
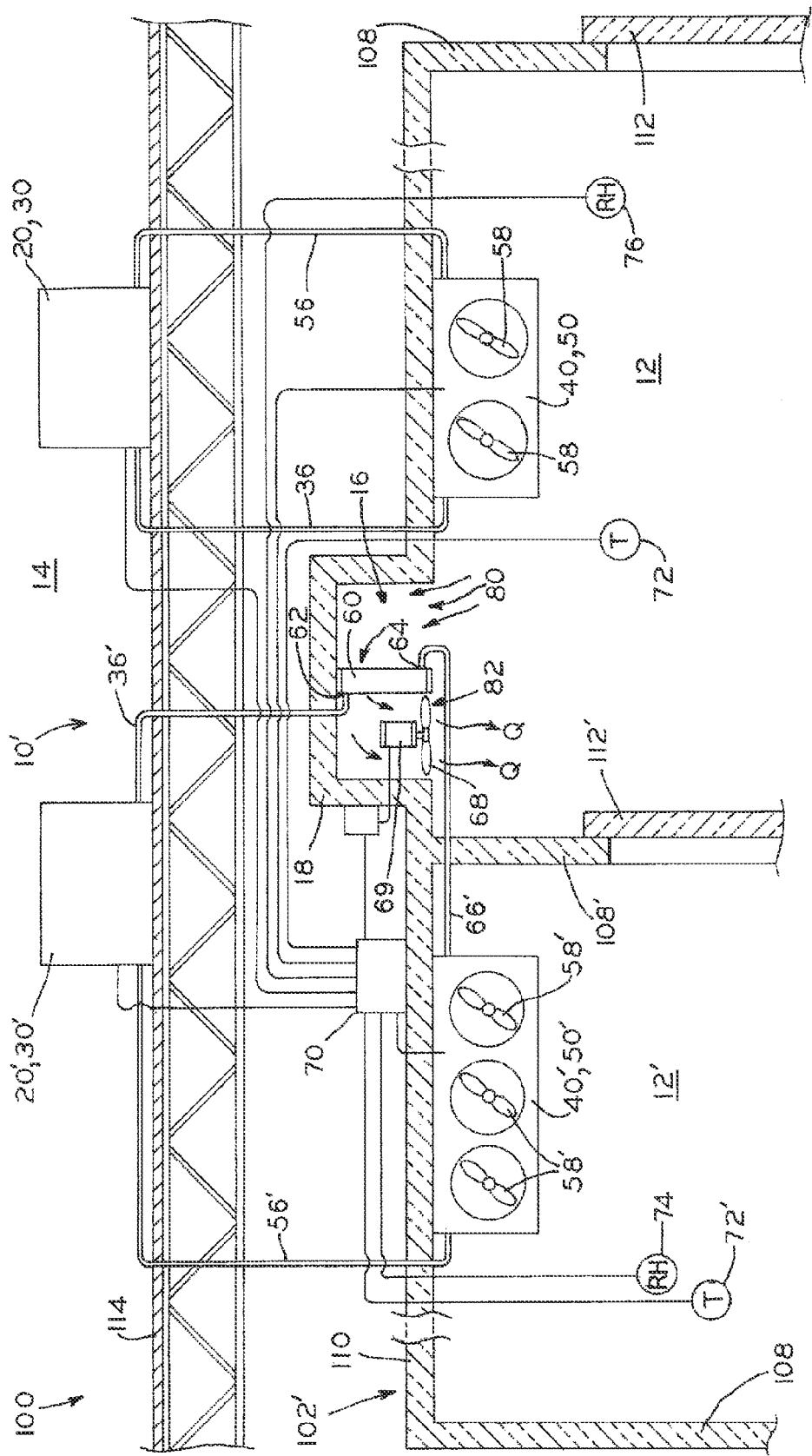
FIG. 5 is a side elevation, cross-section view of the refrigeration system shown in FIG. 4, implemented in a dual chamber refrigerator/freezer design.

As illustrated, refrigeration system 10' includes a vapor compression refrigeration circuit operating on conditioned space 12, and including compressor 20, condenser 30, expansion valve 40 and evaporator 50 serially connected in a similar fashion to refrigeration system 10. However, as described in further detail below, supplemental heat exchanger 60 is no longer functionally interposed between condenser 30 and evaporator 50, but instead is placed in the flow path of a second closed-loop vapor compression refrigeration circuit operating on a second, colder conditioned space 12'. This second conditioned space 12' is thermally isolated from conditioned space 12 by zone boundary Z as shown schematically in FIG. 4. As shown in FIG. 5 and further described below, zone boundary Z may be defined by an interior insulated wall 108' and door 112' located within refrigeration housing 102.

Conditioned spaces 12, 12' are maintained with differing climatic conditions, such as differing temperatures and/or humidity levels. For example, conditioned space 12 may be a cooler maintained at a temperature above the freezing point of water, while conditioned space 12' may be a freezer with a temperature maintained below the freezing point of water. For purposes of the present disclosure and as a simplified example, conditioned space 12 can be considered to be "cool" conditioned space while conditioned space 12' may be considered as a "cold" conditioned space. In order to maintain cold space 12' at a temperature below that of cool space 12, a separate closed loop of refrigerant flow with a separate set of components are provided to effect a separate and distinct vapor compression refrigeration cycle. In an exemplary embodiment, the second cycle is similar to the cycle described above with respect to refrigeration system 10, except the various components may have additional power and technical specifications to maintain a colder space.

Thus, a second quantity of refrigerant circulates from compressor 20' to condenser 30', which discharges hot liquid phase refrigerant to expansion valve 40', which converts such hot liquid phase refrigerant to a cold mixed liquid/vapor phase refrigerant and discharges such cold refrigerant to evaporator 50'. Evaporator 50' absorbs heat from cold conditioned space 12' and discharges a superheated vapor-phase refrigerant back to compressor 20' where the cycle begins again. As illustrated in FIG. 4, supplemental heat exchanger 60 is functionally interposed between condenser 30' and evaporator 50' such that the heat selectively transferred through supplemental heat exchanger 60 is received from, and acts to lower the temperature of, the quantity of hot liquid-phase refrigerant circulating in the refrigerant circuit of refrigeration system 10' operating on cold conditioned space 12'. At the same time, heat exchanger fan 68 is disposed within cool conditioned space 12, such that heat absorbed from the quantity of a refrigerant operating on cold conditioned space 12' is exhausted into cool conditioned space 12.

Turning to FIG. 5, an exemplary spatial arrangement and configuration for implementation of refrigeration system 10' is illustrated in the context of a building, such as warehouse 100. As in the above-described refrigeration system 10 having only a single conditioned space 12 (FIG. 3), refrigeration housing 102' is provided with insulated walls 108 and an insulated ceiling 110. Refrigeration housing 102' may also be received within the interior space of warehouse 100, with a head space between insulated ceiling 110 and roof 114 of warehouse 100. Assemblies including compressor 20 and condenser 30, as well as compressor 20' and condenser 30' may be mounted in ambient air 14 upon roof 114. In order to thermally isolate cool conditioned space 12 from cold conditioned space 12', an interior insulated wall 108' is disposed therebetween. An interior door 112' may be provided to allow access to cold conditioned space 12' from cool conditioned space 12 by people and/or equipment, such as forklift F shown in FIG. 1.

In order to effect the take up of heat from fluid conduit 36' and the refrigerant servicing cold conditioned space 12', heat exchanger inlet 62 is fluidly connected to conduit 36' as illustrated in FIGS. 4 and 5. Further, in order to maintain the closed and fluidly isolated path for the refrigerant used for cold conditioned space 12', heat exchanger outlet 64 is fluidly coupled to fluid conduit 66' such that the selectively cooled liquid phase refrigerant passing through supplemental heat exchanger 60 is received at expansion valve inlet 42' as shown in FIG. 4.

However, insulated protrusion 18 is formed in a portion of insulated ceiling 110 physically above cool conditioned space 12, as illustrated in FIG. 5. Thus, selectively thermally isolated air space 16 includes fluid inlet 80 which draws air from cool conditioned space 12, and air outlet 82 which selectively exhausts heat Q into cool conditioned space 12 in a similar fashion to system 10 described above. Thus, supplemental heat exchanger 60 receives heat from the refrigerant circuit serving cold conditioned space 12', but exhausts this heat Q into cool conditioned space 12.

Accordingly, refrigeration system 10' can still reduce relative humidity in cool conditioned space 12 to a level at or below a set point programmed into controller 70, as described above. However, rather than offsetting the extra energy required of evaporator 50 to remove the additional sensible heat Q discharged into conditioned space 12 (i.e., by reducing the heat removal load of thermostatic expansion valve 40 as described above), the energy savings arising from removal of heat Q from the refrigeration circuit is instead realized by compressor 20' servicing cold conditioned space 12'.

This exemplary arrangement provides increased efficiency in the dual-zone system provided by refrigeration system 10', because the refrigeration components used to maintain a set point temperature in cold conditioned space 12' require more energy than the components used for conditioned space 12 for the same refrigeration capacity. This additional energy usage follows from the fact that the temperature differential between cold conditioned space 12' and ambient air 14 is larger than the corresponding differential between cool conditioned space 12 and ambient air 14, as well as because the nominal temperature which must be maintained within cold conditioned space 12' is lower. This greater demand on the refrigeration circuit for cold space 12' dictates that additional enthalpy must be added and removed from the circulating refrigerant, and/or a greater volume of circulation of the second quantity of refrigerant may be required for a given quantity of heat removal. By functionally interposing supplemental heat exchanger 60 between condenser 30' and evaporator 50' of cold conditioned space 12', but exhausting heat Q into cool conditioned space 12, energy inputs are effectively removed from the refrigeration circuit serving cold conditioned space 12' (which is relatively less efficient) and shifted instead to the refrigeration circuit serving cool conditioned space 12 (which is relatively more efficient). The resulting enhancements to efficiency are realized while still providing humidity control within cool conditioned space 12, in the same manner as described in detail above.

In the exemplary embodiment of FIGS. 4 and 5, controller 70 is operably (e.g., electrically) connected to temperature sensor 72 contained within conditioned space 12, as well as temperature sensor 72' contained within cold conditioned space 12'. Controller 70 may independently operate condenser motors 29, 29' and evaporator motors 59, 59' to maintain separate and distinct temperature set points for conditioned spaces 12, 12', respectively. In addition, humidity sensor 74 may be placed within cold conditioned space 12', while the other humidity sensor 76 may be placed within cool conditioned space 12. In the illustrated embodiment, the relative humidity of conditioned space 12 may be controlled by controller 70 according to a preprogrammed set point as compared to humidity sensor 76 by selectively controlling heat exchanger motor 69. Relative humidity as measured by sensor 74 in cold conditioned space 12' may be separately controlled by controller 70 using traditional dehumidification structures and techniques.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A vapor compression refrigeration system for controlling a temperature and a humidity of a conditioned space, the system comprising:
    a ceiling located at an upper portion of said conditioned space, said ceiling having an insulated protrusion extending upwardly therefrom to define an interior cavity, said interior cavity defining a bottom opening that is physically open to said conditioned space;
    a fan fluidly disposed between said bottom opening and said conditioned space, said fan selectively operable to circulate air from said conditioned space through said interior cavity when said fan is activated or to allow air to thermally stratify within said interior cavity when said fan is deactivated such that a quantity of heat is stored in the interior cavity, whereby said insulated protrusion defines a selectively thermally isolated air space located above the conditioned space;
    a quantity of refrigerant;
    a compressor having a compressor inlet receiving said quantity of refrigerant in a cool vapor state, said compressor operable to elevate a vapor pressure and a vapor temperature of said quantity of refrigerant such that said quantity of refrigerant is converted into a hot vapor state and discharged at a compressor outlet;
    a condenser disposed outside the conditioned space and downstream of said compressor, said condenser having a condenser inlet which receives said quantity of refrigerant in a hot vapor state downstream of said compressor outlet, said condenser operable to transfer heat from said quantity of refrigerant to ambient air around said condenser such that said quantity of refrigerant is converted to a liquid state and discharged at a condenser outlet;
    an expansion valve disposed downstream of said condenser, said expansion valve having an expansion valve inlet which receives said quantity of refrigerant in a liquid state, said expansion valve operable to expand said quantity of refrigerant from a liquid state to one of a cooled liquid state and a cooled vapor state which is discharged at an expansion valve outlet;
    an evaporator disposed in fluid communication with the conditioned space and downstream of said expansion valve outlet, said evaporator having an evaporator inlet which receives said quantity of refrigerant in one of a cooled vapor state and a cooled liquid state, said evaporator operable to transfer heat from air in said conditioned space to said quantity of refrigerant such that said quantity of refrigerant is converted to a cool vapor state and discharged at an evaporator outlet;
    a heat exchanger positioned downstream of said condenser and upstream of said expansion valve and disposed in said selectively thermally isolated air space located above said conditioned space, said heat exchanger having a heat exchanger inlet which receives said quantity of refrigerant in a liquid state at a first liquid temperature and a heat exchanger outlet which discharges a liquid at a second liquid temperature,
        said heat exchanger in selective fluid communication with said air in said conditioned space,
        said heat exchanger operable to transfer heat from said quantity of refrigerant to said air in said conditioned space when said fan is activated such that said heat exchanger is in fluid communication with said air, whereby said second liquid temperature is less than said first liquid temperature, and
        said heat exchanger operable as a non-heat exchanging fluid conduit when said fan is deactivated and the air is stratified within said thermally isolated air space, such that the quantity of heat is stored in the interior cavity of the insulated protrusion and said heat exchanger is not in fluid communication with said air in said conditioned space, whereby said second liquid temperature is substantially equal to said first liquid temperature; and
    a controller operably connected to said fan and receiving at least one signal from a sensor disposed in said conditioned space,
        said controller programmed to activate or increase a speed of said fan to exhaust the quantity of heat from said interior cavity to said conditioned space when said sensor indicates a need for increased heat in said conditioned space, and
        said controller programmed to slow or stop said fan to allow the quantity of heat air to accumulate in said insulated protrusion when said sensor does not indicate a need for increased heat in said conditioned space.

2. The vapor compression refrigeration system of claim 1, wherein:
    the sensor comprises at least one humidity sensor in said conditioned space; and
    said controller receives a signal from said at least one humidity sensor, said controller programmed to compare said signal to a preprogrammed setpoint for a desired humidity in said conditioned space, said controller operably connected to activate said heat exchanger fan when the actual humidity in said conditioned space as measured by said at least one humidity sensor is higher than the desired humidity.

3. The vapor compression refrigeration system of claim 2, wherein said sensor further comprises a temperature sensor in said conditioned space, said controller receiving a temperature signal from said temperature sensor indicative of the temperature within said conditioned space,
    said controller operable to compare said temperature signal to a preprogrammed temperature setpoint for a desired temperature in said conditioned space,
    said controller operably connected to activate at least one of said evaporator and said compressor when the temperature in said conditioned space as measured by said temperature sensor is higher than the desired temperature.

4. The vapor compression refrigeration system of claim 1, wherein said quantity of refrigerant is contained within a closed-loop system including said compressor, said condenser, said expansion valve, said evaporator and said heat exchanger.

5. The vapor compression refrigeration system of claim 1, wherein the conditioned space comprises a volume of at least 500 cubic feet.

6. A refrigeration system comprising:
a refrigeration housing including insulated walls and an insulated ceiling enclosing a conditioned space;
an insulated air space selectively thermally isolated from said conditioned space, said insulated air space contained within an insulated protrusion extending upwardly from said insulated ceiling to define an interior cavity defining a bottom opening that is physically open to said conditioned space, said insulated air space having an air inlet adapted to selectively receive air from said conditioned space into said air space, and an air outlet adapted to selectively discharge air from said air space into said conditioned space;
a fan fluidly disposed between said bottom opening and said conditioned space, said fan selectively operable to circulate air from said conditioned space through said interior cavity when said fan is activated or to allow air to thermally stratify within said interior cavity when said fan is deactivated such that a quantity of heat is stored in the interior cavity, whereby said insulated protrusion defines a selectively thermally isolated air space located above the conditioned space;
a heat exchanger disposed in said insulated air space between said air inlet and said air outlet;
a vapor compression refrigeration system adapted to operate on said conditioned space, the system comprising:
a quantity of refrigerant;
a compressor having a compressor inlet receiving said quantity of refrigerant in a cool vapor state, said compressor operable to elevate a vapor pressure and a vapor temperature of said quantity of refrigerant such that said quantity of refrigerant is converted into a hot vapor state and discharged at a compressor outlet;
a condenser disposed outside the conditioned space and downstream of said compressor, said condenser having a condenser inlet which receives said quantity of refrigerant in a hot vapor state downstream of said compressor outlet, said condenser operable to transfer heat from said quantity of refrigerant to ambient air around said condenser such that said quantity of refrigerant is converted to a liquid state and discharged at a condenser outlet;
an expansion valve disposed downstream of said condenser, said expansion valve having an expansion valve inlet which receives said quantity of refrigerant in a liquid state, said expansion valve operable to expand said quantity of refrigerant from a liquid state to one of a cooled vapor state and a cooled liquid state, which is discharged at an expansion valve outlet;
an evaporator disposed in fluid communication with the conditioned space and downstream of said expansion valve outlet, said evaporator having an evaporator inlet which receives said quantity of refrigerant in one of a cooled vapor state and a cooled liquid state, said evaporator operable to transfer heat from air in said conditioned space to said quantity of refrigerant such that said quantity of refrigerant is converted to a cool vapor state and discharged at an evaporator outlet,
said heat exchanger positioned downstream of said condenser and upstream of said expansion valve, said heat exchanger having a heat exchanger inlet which receives said quantity of refrigerant in a liquid state at a first liquid temperature and a heat exchanger outlet which discharges a liquid at a second liquid temperature,
said heat exchanger operable to transfer heat from said quantity of refrigerant to said air in said conditioned space when air flows from said air inlet to said air outlet, whereby said second liquid temperature is substantially less than said first liquid temperature, and
said heat exchanger operable as a non-heat exchanging fluid conduit when air stratifies within said air space, whereby said second liquid temperature is substantially equal to said first liquid temperature; and
a controller operably connected to said fan and receiving at least one signal from a sensor disposed in said conditioned space,
said controller programmed to activate or increase a speed of said fan to exhaust the quantity of heat from said interior cavity to said conditioned space when said sensor indicates a need for increased heat in said conditioned space, and
said controller programmed to slow or stop said fan to allow the quantity of heat air to accumulate in said insulated protrusion when said sensor does not indicate a need for increased heat in said conditioned space.

7. The refrigeration system of claim 6, wherein said insulated protrusion defines a bottom opening that is physically open to said conditioned space but selectively thermally obstructed from said conditioned space.

8. The refrigeration system of claim 7, further comprising a fan positioned at said bottom opening, said fan selectively actuatable to effect thermal transfer from said air space of said insulated protrusion to said conditioned space.

9. The refrigeration system of claim 6, further comprising:
at least one humidity sensor in said conditioned space;
a heat exchanger fan interposed between said selectively thermally isolated air space and said conditioned space, said heat exchanger fan operable to selectively circulate said air from said conditioned space through said heat exchanger; and
a controller receiving a signal from said at least one humidity sensor, said controller operable to compare said signal to a preprogrammed setpoint for a desired humidity in said conditioned space, said controller programmed to activate said heat exchanger fan when the actual humidity in said conditioned space as measured by said at least one humidity sensor is higher than the desired humidity.

10. A dual-zone refrigeration system, comprising:
a refrigeration housing including insulated walls and an insulated ceiling enclosing a cool conditioned space and a cold conditioned space, said cool conditioned space thermally isolated from said cold conditioned space by an interior insulated wall;
an air space selectively thermally isolated from and above said cool conditioned space, said air space having an air inlet adapted to selectively receive air from said cool conditioned space into said air space, and an air outlet adapted to selectively discharge air from said air space into said cool conditioned space;

a heat exchanger disposed in said air space between said air inlet and said air outlet;

a first vapor compression refrigeration system adapted to operate on said cool conditioned space, the system comprising a first quantity of refrigerant, a first compressor, a first condenser disposed outside said cool conditioned space, a first expansion valve, and a first evaporator disposed in fluid communication with said cool conditioned space, a second vapor compression refrigeration system adapted to operate on said cold conditioned space, the system comprising a second quantity of refrigerant, a second compressor, a second condenser disposed outside said cold conditioned space, a second expansion valve, and a second evaporator disposed in fluid communication with said cold conditioned space, said heat exchanger in fluid communication with said second quantity of refrigerant and positioned downstream of said second condenser and upstream of said second expansion valve, said heat exchanger selectively receiving air from said cool conditioned space via said air inlet and selectively discharging air to said cool conditioned space via said air outlet, said heat exchanger receiving said second quantity of refrigerant at a first temperature and discharging said second quantity of refrigerant at a second temperature, said heat exchanger disposed in said air space and operable to selectively transfer heat from said second quantity of refrigerant to said air in said cool conditioned space based on selective air stratification occurring within said air space, such that said second temperature of said second quantity of refrigerant is below said first temperature of said second quantity of refrigerant when such transfer of heat takes place, and said second temperature of said second quantity of refrigerant is substantially equal to said first temperature of said second quantity of refrigerant when such transfer of heat does not take place;

at least one humidity sensor in said cool conditioned space;

a heat exchanger fan interposed between said air space and said cool conditioned space, said heat exchanger fan operable to selectively circulate said air from said cool conditioned space through said heat exchanger to allow air to stratify to accumulate a quantity of heat within said air space or exhaust the quantity of heat from said air space to said conditioned space; and a controller receiving a signal from said at least one humidity sensor, said controller programmed to compare said signal to a preprogrammed setpoint for a desired humidity in said cool conditioned space, said controller further programmed to activate said heat exchanger fan and exhaust the quantity of heat when the actual humidity in said cool conditioned space as measured by said at least one humidity sensor is higher than the desired humidity, and to allow the quantity of heat to accumulate in the air space when the actual humidity is equal to or lower than the desired humidity.

11. The dual-zone refrigeration system of claim 10, further comprising an insulated protrusion extending upwardly from said insulated ceiling physically above said cool conditioned space, said insulated protrusion defining said air space.

12. The dual-zone refrigeration system of claim 11, wherein said insulated protrusion defines a bottom opening that is physically open to said cool conditioned space but selectively thermally obstructed from said cool conditioned space.

13. The dual-zone refrigeration system of claim 12, further comprising a fan positioned at said bottom opening, said fan selectively actuatable to effect thermal transfer from said air space of said insulated protrusion to said cool conditioned space.

14. A method of installing a refrigeration system, the method comprising:
    placing an evaporator within a conditioned space;
    placing a condenser outside the conditioned space;
    connecting the evaporator to the condenser with a plurality of fluid conduits to create a closed loop;
    placing a quantity of refrigerant in the closed loop;
    operably connecting an expansion valve downstream of the condenser and upstream of the evaporator;
    operably connecting a compressor downstream of the evaporator and upstream of the condenser;
    operably interposing a heat exchanger downstream of the condenser and upstream of the expansion valve; and
    physically locating said heat exchanger in an air space that is selectively thermally isolated from and above said conditioned space;
    thermally isolating said heat exchanger by allowing a quantity of heat from said quantity of refrigerant to accumulate within said air space via air stratification;
    thermally exposing said heat exchanger to a flow of air from said conditioned space in order to exhaust the quantity of heat from said air space to said conditioned space;
    wherein said step of physically locating said heat exchanger comprises placing said heat exchanger in an insulated protrusion extending above said conditioned space;
    wherein said selective thermal isolation of said heat exchanger from said conditioned space is effected solely by air stratification.

15. The method of claim 14, further comprising cutting a hole in a preexisting insulated ceiling and disposing the insulated protrusion around the hole.

* * * * *